United States Patent
Schäfer

(10) Patent No.: US 9,089,145 B2
(45) Date of Patent: Jul. 28, 2015

(54) SHIRRABLE SPICED CASING WITH INNER COATING

(71) Applicant: World Pac International AG, Balzers (LI)

(72) Inventor: Ekkehardt Th. F. Schäfer, Karlsruhe (DE)

(73) Assignee: World Pac International AG, Balzers (LI)

( * ) Notice: Subject to any disclaimer, the term of this patent is extended or adjusted under 35 U.S.C. 154(b) by 0 days.

(21) Appl. No.: 13/845,423

(22) Filed: Mar. 18, 2013

(65) Prior Publication Data
US 2013/0280390 A1 Oct. 24, 2013

(30) Foreign Application Priority Data
Mar. 20, 2012 (DE) .......................... 10 2012 005 446

(51) Int. Cl.
*A22C 13/00* (2006.01)
*B05C 7/00* (2006.01)

(52) U.S. Cl.
CPC ......... *A22C 13/0003* (2013.01); *A22C 13/0013* (2013.01); *A22C 2013/002* (2013.01); *A22C 2013/0046* (2013.01); *A22C 2013/0053* (2013.01); *A22C 2013/0063* (2013.01); *B05C 7/00* (2013.01)

(58) Field of Classification Search
None
See application file for complete search history.

(56) References Cited

U.S. PATENT DOCUMENTS

| 2,901,358 | A | | 8/1959 | Underwood et al. |
| 3,378,379 | A | | 4/1968 | Shiner et al. |
| 4,357,371 | A | * | 11/1982 | Heinrich et al. ............... 427/238 |
| 4,764,406 | A | * | 8/1988 | Hisazumi et al. ............. 426/105 |
| 4,897,295 | A | * | 1/1990 | Erk et al. ...................... 428/34.8 |
| 5,992,345 | A | * | 11/1999 | Lange et al. .................... 118/13 |
| 7,718,207 | B2 | | 5/2010 | Krallmann et al. |
| 7,935,374 | B2 | * | 5/2011 | Appleby ....................... 426/135 |
| 8,147,933 | B2 | | 4/2012 | Auf Der Heide et al. |

(Continued)

FOREIGN PATENT DOCUMENTS

| DE | 3012250 B1 | 2/1982 |
| DE | 19500470 A1 | 7/1996 |

(Continued)

OTHER PUBLICATIONS

Anon. 2015. Polyamide 6.6. http://www2.ulprospector.com/pm/8_pa66.asp.*

(Continued)

*Primary Examiner* — Carolyn Paden
(74) *Attorney, Agent, or Firm* — Panitch Schwarze Belisario & Nadel LLP

(57) ABSTRACT

A method is provided for coating tubular food casings, especially intestines, with flavoring substances in particle form, especially spices, wherein the tubular casing is wetted on the inside with adhesive and the desired flavoring substances are deposited on the formed adhesive layer. Here, it is essential that the casing, wetted on the inside with adhesive (3), is brought through a particle-shaped flavoring substance supply, formed in the interior of the tube, and a gas cushion, in particular an air cushion, into a non-flat, open cross-sectional shape. The casing wetted with adhesive on its inner side carries along flavoring substances from the flavoring substance supply, when it is pulled through the flavoring substance supply. The casing at least on the inside is made from a hydrophilic plastic.

19 Claims, 3 Drawing Sheets

(56) References Cited

U.S. PATENT DOCUMENTS

| | | |
|---|---|---|
| 8,226,457 B2 * | 7/2012 | Hihnala et al. ............. 452/21 |
| 8,628,386 B2 * | 1/2014 | Schafer ..................... 452/32 |
| 2011/0076367 A1 * | 3/2011 | Auf der Heide et al. ..... 426/135 |
| 2012/0082768 A1 | 4/2012 | Schafer |
| 2014/0212550 A1 * | 7/2014 | Stubbs et al. ............. 426/106 |

FOREIGN PATENT DOCUMENTS

| | | |
|---|---|---|
| DE | 10124581 A1 | 11/2002 |
| DE | 10314699 A1 | 10/2004 |
| EP | 1911352 A1 | 4/2008 |
| EP | 2436268 A1 | 4/2012 |

OTHER PUBLICATIONS

Anon. 2014. Nylon 6. Wikipedia. http://en.wikipedia.org//wiki/Nylon_6.*
Saskiawan, I. 2008. Microbiology2(3)119.*
Mark, James, editor. 2009. Nylon 6 in Polymer Data Handbook, 2nd edition. Oxford University Press, p. 254.*
Mark, James, editor. 2009. Nylon 6.6 in Polymer Data Handbook, 2nd edition. Oxford University Press, p. 263.*
Office Action issued Dec. 5, 2012 in DE Application No. 10 2012 005 446.7.
Search Report issued Jun. 18, 2013 in EP Application No. 13001328.7.

* cited by examiner

SHIRRABLE SPICED CASING WITH INNER COATING

BACKGROUND OF THE INVENTION

The invention relates to a method and a device for coating tubular food casings, especially intestines, with flavoring substances in particle form, especially spices, wherein the tubular casing is wetted on the inside with adhesive and the desired flavoring substances are deposited on the formed adhesive layer.

Tubular sausage casings, which are coated on the inside with spice particles, have been proposed in German published patent application DE 195 00 470. That document starts with a shined sausage casing which, after being pulled into the cylindrical shape, is first wetted on the inside with a liquid adhesive. Then the sausage casing slides along an inner coating ring, which distributes the adhesive uniformly and at the desired thickness. In further processing, compressed air and spices are blown radially via a central feed tube against the inside surface of the sausage casing, where it is held by the deposited adhesive layer. Then, the sausage casing must be dried.

To improve the adhesion of the spices, there can be provided at the end of the feed tube a rotating centrifugal disk, which throws the spice against the inside of the sausage casing under the influence of an additional centrifugal force.

In practice, however, this system has not proven effective, because a uniform flavoring substance coating with sufficient thickness could not be continuously guaranteed.

Instead, it is still typical to form tubular casings, which are to be coated with spices, first in the form of flat foils and to coat these foils. Then the coated flat foil is formed into the tubular shape, wherein it is brought through fitted shaping shoulders into a cylindrical shape and then closed by seams or adhesives along its adjacent or overlapping longitudinal edges.

This process is intensive in terms of time and energy, because the adhesive must be deposited on the foil in a moist, liquid state with the result that the foil must be subjected to an intensive drying process after the deposition of the flavoring substances. The flat foil coated with adhesive and spices is formed into the tubular shape only after the drying and then closed and finished by seams, adhesives, or fusion.

However, these processing steps would be impossible in the moist state of the foil both due to hygienic and also processing technology reasons.

BRIEF SUMMARY OF THE INVENTION

Starting from this prior art, the present invention is based on the object of developing a method for coating with flavoring substances that are not swimming in a carrier liquid, but instead are provided in particle form, in particular spices, herbs, pulverized fruit flavors, and the like. Here, the starting material should not be flat foil, but instead it should be possible to directly use tubular casing foil, which can be natural intestine or single- or multi-layer fiber intestine, single- or multi-layer synthetic intestine, or any other tubular textile casings desired. In addition, the casing foil according to the invention should be shirrable, so that it can be easily stored, transported, and especially further processed in automatic fill and clip machines, without the risk of local peeling of the spices during the shirring.

This object is achieved according to the invention in that the casing wetted with adhesive on the inside is formed into a non-flat, open cross-sectional shape by a particle-shaped flavoring substance supply formed in the inside of the casing and a gas cushion, in particular an air cushion. The casing, wetted with adhesive on its inner side, carries along flavoring substances from the flavoring substance supply, when it is pulled through the flavoring substance supply. The casing is made at least on the inner side predominantly from a hydrophilic plastic.

The invention involves the knowledge, on one hand, that the weight of the flavoring particles filled in the casing in conjunction with the air cushion located above these particles causes an intensive accumulation of the flavoring particles on the inner side of the casing coated with adhesive. On the other hand, the invention involves the knowledge that the prior wetting of the casing with adhesive is surprisingly improved when the inner side of the casing—over its entire surface or locally—is made of a hydrophilic material.

The inner coating of tubular casings has already been known for over 50 years for fluids, in that the casings are pulled through a filled flavoring substance supply. For example, it is known from U.S. Pat. No. 2,901,358 to first pre-treat a cellulose casing designed for sausage casings with glycerin, so that it obtains an approximately gel-like consistency and then fills the casing between a lower pinch zone and an upper pinch zone with a water-soluble chromium chloride solution and also an air cushion. If the casing is then pulled through the two mentioned pinch zones, it then receives a coating with the chromium chloride solution on its inner side. Behind the second pinch zone, the casing is again formed into a blown shape by an air cushion and dried by hot air of 100° C. to 110° C. to a residual humidity of 4% to 6%, whereupon it is then formed into a flat shape and wound onto a roller. This inner coating is used so that the sausage casing can be later easily peeled from the filled sausage. However, it is non-obvious to modify this principle to make possible a coating with particle-shaped flavoring substances that are not swimming in a carrier fluid, but instead are provided in a dry form.

It is even more non-obvious that the inner side wetting of the casing with adhesive improved in that the inner side of the casing is made at least predominantly from hydrophilic plastic. Surprisingly, this produces a more intense, more uniform, and faster wetting of the casing by the adhesive. Therefore, it can be pulled through the coating system at a higher advance feed speed, while simultaneously improving the coating quality.

The hydrophilic plastics can be different materials, even those with fibers, so that additional capillary effects can be produced. Especially suitable are polyamides, preferably PA 4, PA 6, or PA 6.6, which distinguish themselves by comparatively good hydrophilic properties.

A further improvement in the adhesive absorption can be achieved in that the inside of the casing is given a rough texture. The desired surface roughness can be produced by physical or chemical methods, but preferably by UV irradiation or by laser irradiation or by corona treatment, especially in combination with an elongation of the casing. A target is a roughness of at least 0.05 μm, in particular at least 0.1 μm.

Preferably, the inner plastic layer is provided over the entire surface, that is over the entire inner extent of the casing. However, it also lies in the scope of the invention to produce the plastic inner layer as a mesh, non-woven, or similar material made from fine plastic fibers, especially polyamide fibers and to achieve the desired roughness possibly through this mix of materials.

In principle, the casing can be made completely from the hydrophilic material. However, because the preferred polyamide is relatively expensive, it is recommended to form the casing with multiple layers and to provide a thin layer made from hydrophilic material only on the inner side. The thickness of this material layer can lie below 1/10 mm, preferably in the range between approximately 5 μm and approximately 50 μm, in particular between approximately 6 μm and approximately 20 μm.

The inner layer made from hydrophilic material is preferably combined on the outside with more economical materials, in particular polyethylene, so that the desired tear strength is ensured.

The combination with polyethylene also offers the big advantage that the casing obtains an adequate blocking effect with respect to oxygen and water vapor.

The multi-layer configuration of the casing can be produced by co-extrusion or lamination.

Preferably the wetting of the casing with adhesive is performed in that a liquid adhesive supply and optionally a gas cushion are formed in the inside of the casing provided in a non-flat form, and the casing is pulled through the adhesive supply. It is then recommended that the casing pass through at least one pinch zone after its wetting with adhesive. This pinch zone makes it possible to dose the quantity of adhesive remaining on the casing: the stronger the pinching effect is, the less adhesive can be carried along by the casing through the pinch zone.

Such a pinch zone can also be arranged below the flavoring substance supply, in order to form its lower closure, if the casing is then pulled upward at more or less of a rising slope through the flavoring substance supply.

As a result it can be realized such that the device for performing the described coating method has a first wetting station for the inside wetting of the casing with adhesive and a second wetting station for the inside wetting of the casing with flavoring substances and the casing has a non-flat, open cross-sectional shape in both wetting stations by filled adhesive or by filled flavoring substances each in combination with a gas cushion.

In addition, at least one pinch zone is arranged after each wetting station.

Arranging a pinch zone before each wetting station is then necessary if the casing has, at the beginning of the wetting station, a rising profile. Instead it can also be expedient to guide the casing so that a sag is produced in which the casing has at least partially a non-flat, open cross section and is filled with the adhesive or flavoring substance used for the inside coating each in combination with a gas cushion. Then, a pinch zone is recommended only at the end of the wetting station.

For the formation of the pinch zones, one skilled in the art has various options. Thus, the pinch zones could be generated, for example, by funnel-shaped constricted sections of the tubular packing foil—possibly combined with a twisting. It is especially favorable, however, to generate the pinch zones by pinching rollers, where the tubular packing foil is forced into a flat form, where the walls of the tubular packing foil are brought together in tight contact. An especially reliable seal is thereby produced in the upper pinch zone, such that the packing foil is formed into a flat shape not only with a pinching roller, but instead such that two pinching rollers are arranged parallel one next to the other and have no or only a minimal gap for the passage of the casing, so that the shaping of the inflated sack into the flat shape is combined with an additional compression of the two casing layers lying one on top of the other. This therefore produces an especially effective embedding of the powder-like flavoring substances in the adhesive layer of the casing.

So that the compression is ensured without local damage to the relatively thin casing, the pinch rollers preferably have a rubber elastic outside sheathing, for example made of cellular rubber or the like.

In addition, the pressing effect between the casing layers can be increased, such that the pinching rollers have, on their outer sheathing, ribs that run approximately in the axial direction, that is, to some extent, a slight outer toothed arrangement, wherein the ribs of adjacent rollers mesh with each other, that is, engage in each other.

Alternatively, however, it also lies within the scope of the invention to eliminate a pinch zone as the lower closure of the flavoring substance supply, in that the casing is formed into a downward sagging profile in which it assumes at least partially the non-flat, open cross-sectional shape and is filled with the flavoring substance supply and a gas cushion. The same sagging principle can also be applied in the wetting with adhesive.

In tests with the method according to the invention, it has been shown surprisingly that the spices can have a smaller particle size than previously typical sizes. Preferably, spices having a particle size corresponding to 8 mesh to 400 mesh, in particular corresponding to 30 mesh to 50 mesh, are used. For the same quantity of spice, this smaller particle size leads to a stronger flavoring effect or makes it possible, for the same flavoring effect, to reduce the quantity of spices, because the surface area of the particles with respect to the particle mass, which is the decisive factor for the flavoring effect, is increased for smaller particle sizes.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
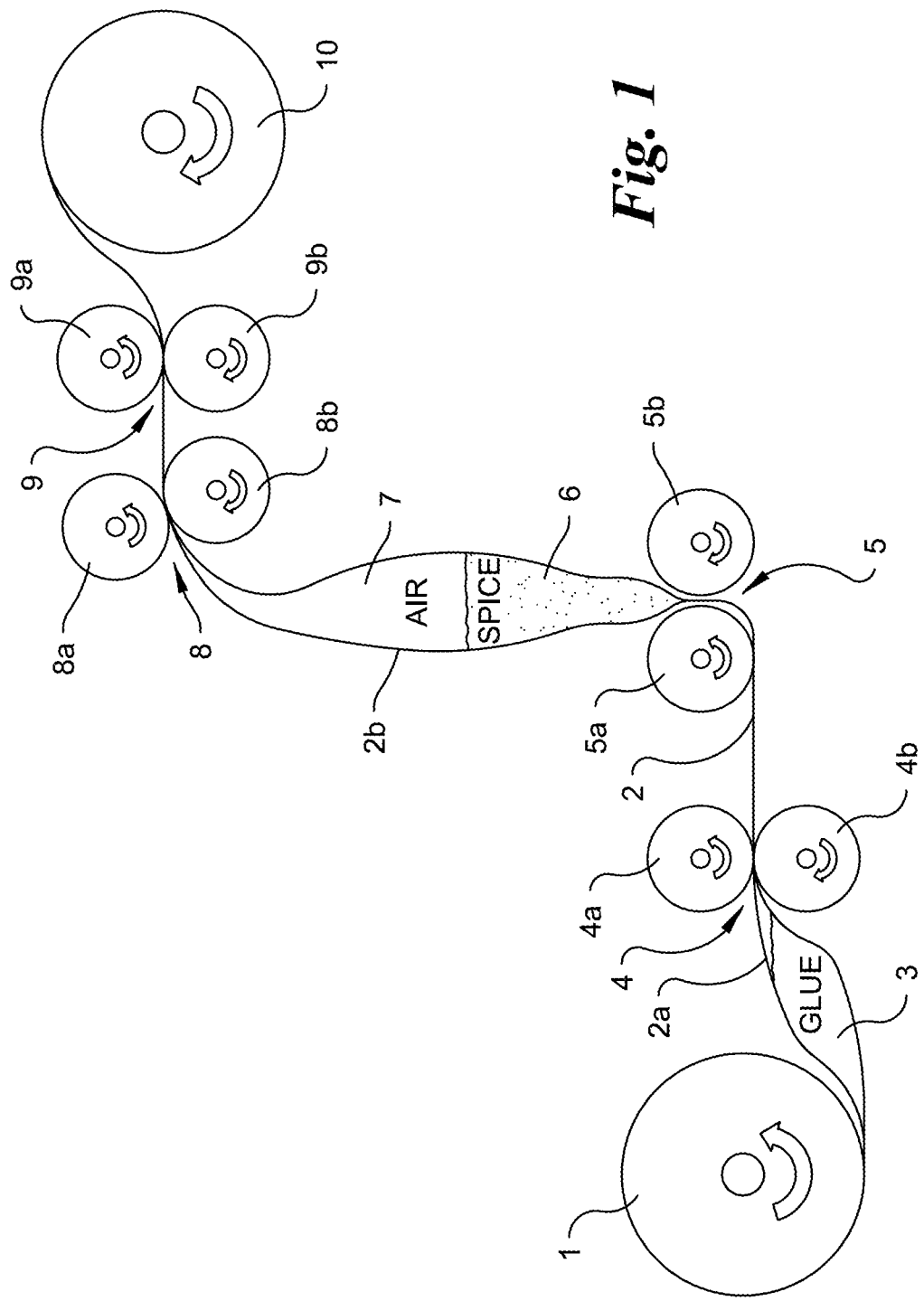
FIG. 1 is a schematic diagram of the complete coating method according to an embodiment of the invention, wherein the finished coated casing is rolled at the end.

The starting point is a supply roller 1, on which the tubular casing 2 is wound in a flat form. The supply roller can take up, for example, a casing that is 40 m to 500 m long.

The casing 2 is a single- or multi-layer casing and comprises, at least on the inside, polyamide, especially a polyamide with good hydrophilic properties, such as PA 6 or PA 6.6. Apart from the hydrophilic inner layer, the casing can also comprise a wide range of different materials, for example reinforced fiber intestines, collagen intestines or dried natural intestines, but also coated textile intestines or frame intestines, which are coated with collagen, carrageenan, or acrylate, or other single- and multi-layer substances. Polyethylene is particularly suitable for combination with the polyamide inner layer.

At the start, the casing 2, shown as an open casing end, is filled with a known liquid adhesive 3, which is approved in terms of food regulations, and possibly also with support air, so that the casing assumes the shape of a sack 2a filled partially or completely with adhesive 3. The quantity of adhesive is measured out so that the entire casing wound on the supply roller 1 can be coated with adhesive. The casing 2 is fed in dry form to the adhesive, so that there are good bonding conditions for the adhesive. The uptake of the adhesive is favored in that the casing inside is made of polyamide, which is characterized by good water absorption properties. This guarantees an intensive and uniform wetting of the casing with the adhesive.

At the same time, a powder-like or liquid preservative, especially based on potassium sorbate, could also be filled into the sack 2a, so that the casing is protected from the formation of mold, despite the high moisture content. Alternatively or additionally, this preservative could also be supplied at a later time, for example together with the flavoring substances.

The adhesive can be any materials that have been approved in terms of food regulations, in particular starches, modified starches, gelatins, pullulan, xanthan gum, casein, collagen, carrageenan, alginate, carboxymethyl cellulose, and the like, each in a low-viscosity solution, in order to ensure good wetting.

The lower end of the sack 2a, filled with adhesive, is formed in the embodiment by its tight contact closing the sack against the supply roller 1. Instead, a pinch zone could also be arranged here in the form of pinching rollers or the like.

Then, the casing is led between two pinching rollers 4a and 4b. These pinching rollers press the packing foil into a flat shape and define, through their pinching force, the quantity of adhesive that can be carried along by the casing on its inner side when passing through the two pinching rollers.

After passing through the first wetting station described above, the casing is led to a pinch zone 5 formed by two pinching rollers 5a and 5b. After passing this station, the casing again assumes the shape of a sack, which rises upward and preferably approximately vertically upward and which is marked by the reference symbol 2b. This sack is filled in its lower region with powder-dry flavoring particles 6, in particular spices corresponding to 30 mesh to 50 mesh, that is, a grain size of approximately 0.3 mm to 0.6 mm. The pinch zone 5 is so constructed with respect to its pressing against the walls of the casing, being flat and lying on each other, so that the flavoring substances 6 cannot slide downward out of the sack 2b.

In the upper area of the sack there is an air cushion 7. This air cushion 7 has essentially the object of spacing the spices 6 from the upper sack end formed by another pinch zone 8 in the form of two pinching rollers 8a and 8b, so that only those spice particles bonded to the inside wall of the casing 2 can pass the gap between the pinching rollers 8a and 8b, that is, no clumps of spices are collected by the pinching rollers from the supply 6 and fed to further processing. The casing then passes through its second wetting station.

Here, it is especially expedient to subject the sack 2b, especially in the upper region, to slight vibrations, so that compacted clumps of spices are shaken off of the casing 2 and fall back into the supply 6. This improves the uniformity of the spice coating. The sack 2b can be vibrated by externally attached oscillators or directly by corresponding oscillations of the upper pinching rollers 8a and 8b.

The pinching rollers have significantly larger diameters than typical guide rollers. This, in combination with their rubber elastic outside sheathing, has the effect that a strip is produced that is several centimeters wide where the casing is pressed together in the advancing direction of the packing foil.

The introduction of the spices 6 and also the air cushion 7 is realized while threading a new casing, before the start of the casing reaches the pinch zone 8. After passing the pinching rollers 8a and 8b, the sack 2b is sealed and at the same time the spice particles carried upward by the casing are pressed by the pinching rollers 8a and 8b against the inner wall of the casing, so that the spice particles form a good bond with the casing and do not separate during further processing of the casing.

The spacing between the lower pinch zone 5 and the upper pinch zone 8 is preferably variable, especially in that the pinch rollers of the upper pinch zone 8 can be moved downward, in order to compensate for the volume of the sack 2b being reduced during the coating. This arrangement ensures that the casing maintains a firm sack shape, even if the sack itself becomes shorter and shorter with increasing coating, because the pinch zones 5 and 8 are getting closer and closer.

Directly behind the pinch zone 8 another pinch zone 9 preferably follows, which is formed by pinching rollers 9a and 9b. This zone forms a more intense bond between the casing and the entrained spices and improves the seal relative to the air cushion 7.

Finally, the finished coated casing is led—optionally via additional guide rollers—to a windup roller 10.

As soon as the casing is threaded through additional pinch rollers and here filled with adhesive 3, spices 6, and air cushion 7, and has been fixed on the windup roller 10, it runs continuously from the supply roller 1 to the windup roller 10 and is thereby coated. The advancing of the casing is preferably performed by the pinching rollers themselves. In general, it is here sufficient if only one of two corresponding pinching rollers is driven. In the embodiment shown, the driving roller in each case is the pinching roller having the black shaded arrow indicating the direction of rotation.

An intermediate drying of the casing can be omitted, because by corresponding process control, its moisture is maintained at approximately 10% to a maximum of approximately 20% after the coating with spices.

Preferably, in all of the pinch zones, one of the two pinch rollers is adjustable with regard to its spacing from the adjacent pinch roller, in order to simplify the threading of the casing 2.

Apart from its hydrophilic inner layer made of almost any desired material, the described casing 2 can be formed with one or more layers, optionally also with coatings and/or laminates, in particular to make the casing essentially impermeable relative to water vapor and/or oxygen.

In the embodiment, the coated casing 2 is fed in a flat shape to a windup roller 10. It is also possible, however, to shirr the casing online.

Figure 2:
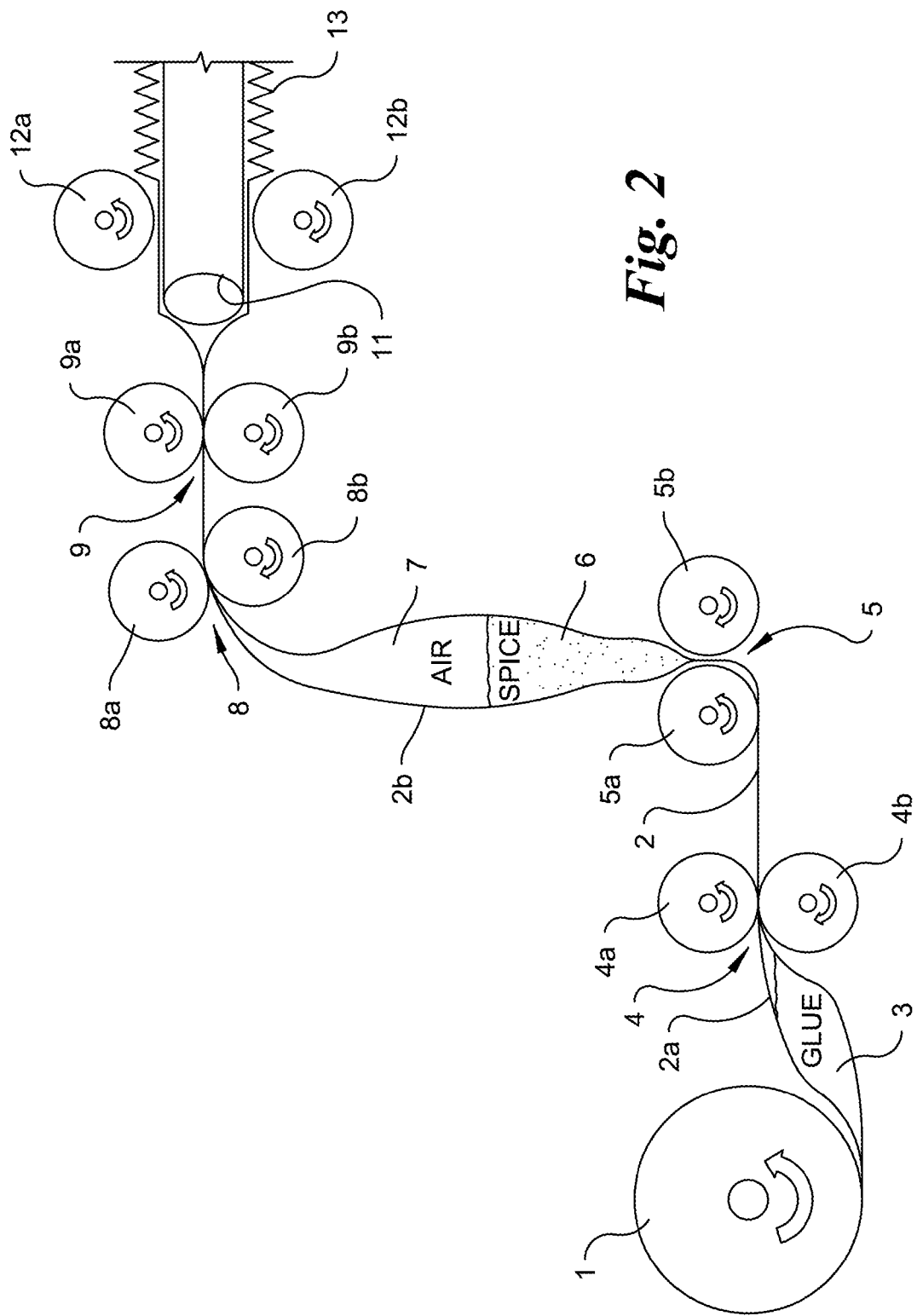
FIG. 2 is the same schematic diagram as in FIG. 1, except wherein the casing is shined at the end.

This especially preferred variant is shown in FIG. 2. The completely coated casing 2 is fed axially onto a cylindrical shirring tube 11, and indeed by multiple shirring rollers distributed over the periphery, of which two shining rollers 12a and 12b are visible. After passing these shining rollers, sections of the casing approximately 5 m to approximately 50 m long are formed by axial compression into accordion-like caterpillars 13, like those preferably desired by the meat and cheese industry.

The shining process itself is known per se and therefore not described in more detail. It is essential, however, that the shirring process take place directly after the inside coating of the casing with spice particles, without the casing requiring heating or drying. This produces considerable energy savings.

Figure 3:
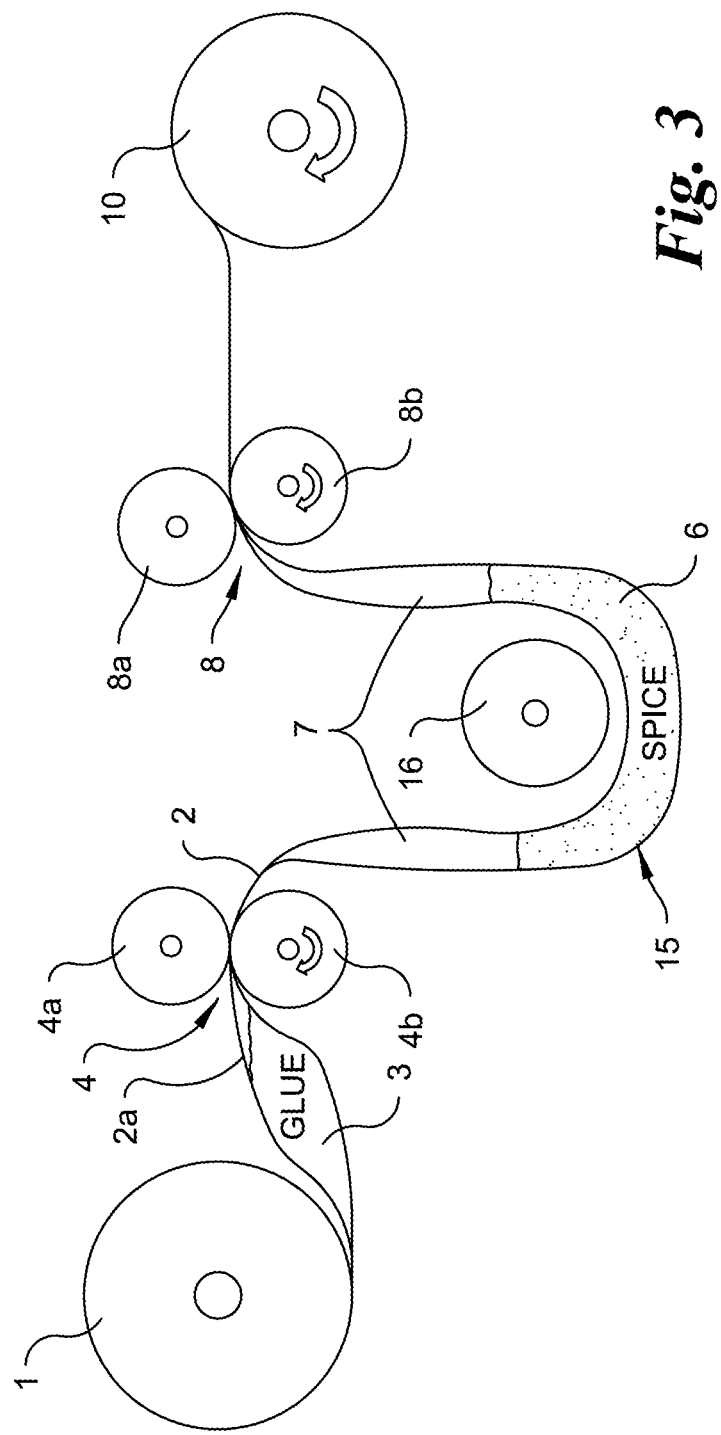
FIG. 3 is a schematic diagram showing an alternative embodiment of the invention, in which the casing forms a sag.

FIG. 3 shows an alternative guidance of the casing 2. Here, the lower pinch zone 5 and the formation of the vertical sack 2b are eliminated and the casing is instead guided so that it forms a sag 15. In the area of this sag, the casing is partially filled with the particle-shaped flavoring substance supply 6, so that the flavoring substance supply collects in the lower area of the sag, while air cushions 7 are contained in the two upward running areas of the sag 15 above the flavoring substance supply. Here, it is essential that the flavoring substance supply 6 is measured out so that it wets the casing along its entire extent up to the completion of the coating method.

As FIG. 3 shows, the flavoring substance supply 6 is higher in the part of the sag 15 rising on the right than in the left region. This is due to the fact that the casing transports flavoring substance into the section of the sag 15 rising on the right due to its advancing motion until an equilibrium state is reached based on the difference in filling height.

In the embodiment the sag 15 runs around a roller 16 arranged within the pass-through area. This roller is not absolutely necessary, but it can be used as a dancer roller, in order to control the advance, that is, in particular the driving at the pinch zone 8, so that the sag 15 maintains the desired sagging depth during the coating process. This essentially involves keeping the flavoring substance supply 6 at a sufficient distance from the subsequent pinch zone 8.

Incidentally, the coating method in FIG. 3 corresponds to the method described above; therefore the same reference symbols are used for the corresponding parts.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for coating tubular food casings with flavoring substances in a powder-like form wherein the tubular casing is wetted on its inside with adhesive and desired flavoring substances are deposited on a formed adhesive layer, the method comprising:
    wetting the casing on the inside with adhesive, wherein the casing at least on the inside is made predominantly from a hydrophilic plastic,
    bringing the wetted casing into a non-flat, open cross-sectional shape by forming a powder-like flavoring substance supply and a gas cushion in the inside of the casing,
    pulling the casing through the flavoring substance supply such that the casing wetted with adhesive on the inside carries along flavoring substances from the flavoring substance supply, and
    passing the casing through at least one pinch zone, generated by deflection rollers, after its wetting with adhesive, such that the tubular casing is subjected to contact pressure.

2. The method according to claim 1, wherein the hydrophilic plastic consists of at least one polyamide.

3. The method according to claim 2, wherein the at least one polyamide is selected from the group consisting of polyamide 4, polyamide 6, and polyamide 6.6.

4. The method according to claim 1, wherein the casing has a multi-layer structure.

5. The method according to claim 4, wherein an inner layer of the multi-layer structure, made of a hydrophilic plastic, has a maximum thickness of approximately 1/10 mm.

6. The method according to claim 5, wherein the inner layer has, at least on its inside, a roughness of at least 0.1 µm.

7. The method according to claim 4, wherein an inner layer of the multi-layer structure, made of hydrophilic plastic, is combined with polyethylene.

8. The method according to claim 4, wherein the multi-layer structure is produced by co-extrusion and/or by lamination.

9. The method according to claim 1, wherein the casing has a thickness between approximately 20 µm and approximately 80 µm.

10. The method according to claim 1, wherein the gas cushion is an air cushion.

11. The method according to claim 1, wherein the casing, wetted on the inside with adhesive, is formed into a downward sagging profile, in which it assumes at least partially the non-flat, open cross-sectional shape and is filled with the flavoring substance supply and the gas cushion.

12. The method according to claim 1, wherein the flavoring substances are spices.

13. The method according to claim 12, wherein spices having a particle size corresponding to approximately 30 mesh to approximately 50 mesh are used in the flavoring substance supply.

14. The method according to claim 1, wherein the tubular food casings comprise intestines.

15. The method according to claim 1, wherein the adhesive is a liquid adhesive supply.

16. A method for coating tubular food casings with flavoring substances in a powder-like form wherein the tubular casing is wetted on its inside with adhesive and desired flavoring substances are deposited on a formed adhesive layer, the method comprising:
    wetting the casing on the inside with adhesive, wherein the casing at least on the inside is made predominantly from a hydrophilic plastic,
    bringing the wetted casing into a non-flat, open cross-sectional shape by forming a powder-like flavoring substance supply and a gas cushion in the inside of the casing,
    pulling the casing with an upward slope through the flavoring substance supply such that the casing wetted with adhesive on the inside carries along flavoring substances from the flavoring substance supply, and
    forming a lower closure of the flavoring substance supply by a pinch zone.

17. A method for coating tubular food casings with flavoring substances in a powder-like form wherein the tubular casing is wetted on its inside with adhesive and desired flavoring substances are deposited on a formed adhesive layer, the method comprising:
    wetting the casing on the inside with adhesive, wherein the casing at least on the inside is made predominantly from a hydrophilic plastic,
    bringing the wetted casing into a non-flat, open cross-sectional shape by forming a powder-like flavoring substance supply and a gas cushion in the inside of the casing,
    pulling the casing through the flavoring substance supply such that the casing wetted with adhesive on the inside carries along flavoring substances from the flavoring substance supply, and
    winding up the casing without subsequent drying after its coating with the flavoring substances.

18. A method for coating tubular food casings with flavoring substances in a powder-like form wherein the tubular casing is wetted on its inside with adhesive and desired flavoring substances are deposited on a formed adhesive layer, the method comprising:

wetting the casing on the inside with adhesive, wherein the casing at least on the inside is made predominantly from a hydrophilic plastic, bringing the wetted casing into a non-flat, open cross-sectional shape by forming a powder-like flavoring substance supply and a gas cushion in the inside of the casing, pulling the casing through the flavoring substance supply such that the casing wetted with adhesive on the inside carries along flavoring substances from the flavoring substance supply, and bringing the casing into a shirred shape without subsequent drying after its coating with the flavoring substances.

19. A method for coating tubular food casings with flavoring substances in a powder-like form wherein the tubular casing is wetted on its inside with adhesive and desired flavoring substances are deposited on a formed adhesive layer, the method comprising:

wetting the casing on the inside with adhesive, wherein the casing at least on the inside is made predominantly from a hydrophilic plastic, bringing the wetted casing into a non-flat, open cross-sectional shape by forming a powder-like flavoring substance supply and a gas cushion in the inside of the casing, pulling the casing through the flavoring substance supply such that the casing wetted with adhesive on the inside carries along flavoring substances from the flavoring substance supply, and subjecting the casing to shaking movements in a region above the flavoring substance supply after its coating with the flavoring substances, in order to shake off non-adhered flavoring substances.

* * * * *